(12) United States Patent
Gurunathan et al.

(10) Patent No.: US 11,494,769 B2
(45) Date of Patent: *Nov. 8, 2022

(54) SYSTEM, METHODS AND COMPUTER PROGRAM PRODUCTS FOR IDENTITY AUTHENTICATION FOR ELECTRONIC PAYMENT TRANSACTIONS

(71) Applicant: MASTERCARD INTERNATIONAL INCORPORATED, Purchase, NY (US)

(72) Inventors: Arunmurthy Gurunathan, Chesterfield, MO (US); Ravi Pareek, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 25 days.

This patent is subject to a terminal disclaimer.

(21) Appl. No.: 16/732,889

(22) Filed: Jan. 2, 2020

(65) Prior Publication Data

US 2020/0226601 A1 Jul. 16, 2020

(30) Foreign Application Priority Data

Jan. 10, 2019 (IN) .............................. 201911001234

(51) Int. Cl.
*G06Q 20/40* (2012.01)
*G06Q 40/02* (2012.01)
*H04L 9/40* (2022.01)

(52) U.S. Cl.
CPC ......... *G06Q 20/4014* (2013.01); *G06Q 40/02* (2013.01); *H04L 63/0876* (2013.01)

(58) Field of Classification Search
None
See application file for complete search history.

(56) References Cited

U.S. PATENT DOCUMENTS 5,812,668 A * 9/1998 Weber ................ G06Q 20/0855
705/16
5,850,446 A * 12/1998 Berger ................ H04L 12/5692
713/153

(Continued)

FOREIGN PATENT DOCUMENTS

EP 2947615 A1 11/2015
JP 6257091 B2 1/2018

(Continued)

OTHER PUBLICATIONS

Soonhwa Sung, Cheong Youn, Eunbae Kong and Jaecheol Ryou, "User authentication using mobile phones for mobile payment," 2015 International Conference on Information Networking (ICOIN), Cambodia, 2015, pp. 51-56,(User Authentication). (Year: 2015).*

(Continued)

*Primary Examiner* — Chikaodinaka Ojiaku
(74) *Attorney, Agent, or Firm* — Harness, Dickey & Pierce, P.L.C.

(57) ABSTRACT

The disclosure relates to identity authentication in electronic payment transactions. The disclosure comprises (i) receiving an identity authentication request responsive to a request for electronic payment initiated in a network session between a client terminal and a merchant server, (ii) receiving the payor account, the payee account and a payment amount, (iii) receiving session data parameters corresponding to a network communication session, (iv) generating an authentication data record based on the session data parameters, (v) transmitting the generated authentication data record to a terminal device associated with the identified payor account, (vi) retrieving from the client terminal, data record(s) associated with electronic payment transactions involving the client terminal, (vii) comparing the data records retrieved from the client terminal against the generated authentication data record, and (viii) responsive to a match between a data (Continued)

record retrieved from the client terminal against the generated authentication data record, generating an identity confirmation decision.

13 Claims, 7 Drawing Sheets

(56) References Cited

U.S. PATENT DOCUMENTS

| | | | | |
|---|---|---|---|---|
| 5,889,863 A * | 3/1999 | Weber | G06Q 20/00 705/40 |
| 5,931,917 A * | 8/1999 | Nguyen | G06Q 20/00 709/216 |
| 5,943,424 A * | 8/1999 | Berger | G06Q 30/0601 705/26.1 |
| 5,978,840 A * | 11/1999 | Nguyen | H04L 9/40 705/79 |
| 5,983,208 A * | 11/1999 | Haller | G06Q 20/202 705/40 |
| 5,987,132 A * | 11/1999 | Rowney | H04L 9/40 705/40 |
| 5,987,140 A * | 11/1999 | Rowney | G06Q 20/027 705/26.1 |
| 5,996,076 A * | 11/1999 | Rowney | G06Q 20/12 705/76 |
| 6,002,767 A * | 12/1999 | Kramer | G06Q 20/403 713/153 |
| 6,021,399 A | 2/2000 | Demers et al. | |
| 6,026,379 A * | 2/2000 | Haller | G06Q 20/00 705/34 |
| 6,119,105 A * | 9/2000 | Williams | G06Q 20/40 705/26.35 |
| 6,178,409 B1 * | 1/2001 | Weber | G06Q 20/027 713/168 |
| 6,253,027 B1 * | 6/2001 | Weber | G06Q 20/00 713/168 |
| 6,324,525 B1 * | 11/2001 | Kramer | G06Q 20/102 705/40 |
| 6,373,950 B1 * | 4/2002 | Rowney | G06Q 30/06 705/64 |
| 6,488,206 B1 * | 12/2002 | Flaig | G06Q 20/341 235/375 |
| 6,944,669 B1 * | 9/2005 | Saccocio | G06Q 30/06 709/224 |
| 7,249,093 B1 * | 7/2007 | King | G06Q 30/06 705/40 |
| 7,623,686 B2 * | 11/2009 | Kondo | G06V 40/18 351/200 |
| 8,630,907 B2 | 1/2014 | Mardikar et al. | |
| 8,635,327 B1 * | 1/2014 | Levergood | H04L 63/10 709/224 |
| 8,943,580 B2 * | 1/2015 | Fadell | G06V 40/1365 726/19 |
| 9,270,676 B2 | 2/2016 | Shiloh | |
| 9,646,294 B2 | 5/2017 | Fisher | |
| 9,785,934 B2 | 10/2017 | Davis et al. | |
| 9,852,418 B2 | 12/2017 | Mardikar | |
| 9,917,827 B2 * | 3/2018 | Levergood | G06Q 20/10 |
| 10,115,100 B2 | 10/2018 | Aabye et al. | |
| 10,290,000 B2 * | 5/2019 | Kenderov | G06Q 20/20 |
| 10,402,814 B2 | 9/2019 | Wong et al. | |
| 10,412,060 B2 | 9/2019 | Narayan et al. | |
| 10,572,875 B2 | 2/2020 | Dominguez et al. | |
| 10,592,718 B2 * | 3/2020 | Khuri-Yakub | A61B 5/1172 |
| 10,783,227 B2 * | 9/2020 | Van Os | G06F 3/016 |
| 10,866,699 B1 * | 12/2020 | Hassan | G06F 21/36 |
| 10,929,515 B2 * | 2/2021 | Prakash | H04L 9/085 |
| 10,959,093 B2 | 3/2021 | Powell et al. | |
| 11,095,439 B1 * | 8/2021 | Vakili | H04L 63/08 |
| 11,114,087 B1 * | 9/2021 | Leslie | G10L 15/20 |
| 11,250,391 B2 | 2/2022 | Sabba et al. | |
| 2001/0027439 A1 * | 10/2001 | Holtzman | G06Q 20/105 705/41 |
| 2002/0052948 A1 * | 5/2002 | Baudu | G06Q 30/02 709/224 |
| 2003/0051138 A1 * | 3/2003 | Maeda | H04M 15/48 713/168 |
| 2003/0140007 A1 * | 7/2003 | Kramer | G06Q 20/12 705/40 |
| 2008/0027809 A1 * | 1/2008 | Storm | G06Q 30/02 705/14.39 |
| 2008/0097925 A1 * | 4/2008 | King | G06Q 40/04 705/26.1 |
| 2008/0117451 A1 * | 5/2008 | Wang | H04L 65/40 358/1.15 |
| 2008/0288363 A1 * | 11/2008 | Ueno | G06Q 30/0635 705/26.81 |
| 2009/0210347 A1 * | 8/2009 | Sarcanin | G06Q 20/38215 705/76 |
| 2010/0322404 A1 * | 12/2010 | Coleman | H04M 3/42068 370/352 |
| 2011/0022481 A1 * | 1/2011 | Horvath | G06Q 20/4016 705/16 |
| 2011/0228989 A1 * | 9/2011 | Burton | G16H 30/20 382/116 |
| 2011/0276484 A1 * | 11/2011 | Pearson | G06Q 20/4014 235/380 |
| 2012/0282893 A1 * | 11/2012 | Kim | G06Q 20/385 455/406 |
| 2013/0024915 A1 | 1/2013 | Jones et al. | |
| 2013/0024916 A1 | 1/2013 | Evans | |
| 2013/0297513 A1 | 11/2013 | Kirillin et al. | |
| 2014/0081854 A1 * | 3/2014 | Sanchez | G06Q 20/3276 705/16 |
| 2015/0086756 A1 * | 3/2015 | Dubey | C09J 7/29 156/60 |
| 2015/0088756 A1 * | 3/2015 | Makhotin | G06Q 20/382 705/71 |
| 2015/0170267 A1 | 6/2015 | Dilip et al. | |
| 2015/0334066 A1 | 11/2015 | Haff et al. | |
| 2016/0132883 A1 | 5/2016 | Evans | |
| 2016/0148201 A1 * | 5/2016 | Kadaster | G06Q 20/02 705/44 |
| 2016/0171493 A1 | 6/2016 | Kapur et al. | |
| 2017/0012949 A1 * | 1/2017 | Boren | H04L 63/045 |
| 2017/0013482 A1 * | 1/2017 | Tandai | H04L 5/0048 |
| 2017/0017957 A1 * | 1/2017 | Radu | G06Q 20/4012 |
| 2018/0150832 A1 * | 5/2018 | Badal-Badalian | G06Q 20/3276 |
| 2018/0253727 A1 * | 9/2018 | Ortiz | G06Q 20/108 |
| 2018/0293573 A1 * | 10/2018 | Ortiz | G06Q 30/0229 |
| 2018/0293834 A1 | 10/2018 | Cage et al. | |
| 2018/0308102 A1 | 10/2018 | Tew et al. | |
| 2019/0044723 A1 * | 2/2019 | Prakash | G06V 40/40 |
| 2019/0065724 A1 * | 2/2019 | Dudley | H04L 9/3271 |
| 2019/0123899 A1 * | 4/2019 | Rutherford | H04L 63/0861 |
| 2019/0139024 A1 * | 5/2019 | Bakshi | H04W 12/72 |
| 2019/0251560 A1 | 8/2019 | Mohsenzadeh | |
| 2019/0356491 A1 * | 11/2019 | Herder, III | H04L 9/30 |
| 2020/0143377 A1 * | 5/2020 | Lam | G06Q 20/40145 |
| 2020/0211009 A1 | 7/2020 | Gurunathan et al. | |
| 2020/0226601 A1 * | 7/2020 | Gurunathan | H04L 63/08 |

FOREIGN PATENT DOCUMENTS

| | | |
|---|---|---|
| KR | 102130726 B1 | 8/2020 |
| WO | WO2010/078522 | 7/2010 |
| WO | WO2017/101995 | 6/2017 |
| WO | WO2018/141047 | 8/2018 |

OTHER PUBLICATIONS

P. Urien, M. Pasquet and C. Kiennert, "A breakthrough for prepaid payment: End to end token exchange and management using secure SSL channels created by EAP-TLS smart cards," 2011 International Conference on Collaboration Technologies and Systems (CTS), 2011, pp. 476-483 (End to End) (Year: 2011).*

R. Abdellaoui and M. Pasquet, "Secure Communication for Internet Payment in Heterogeneous Networks," 2010 24th IEEE Interna-

(56) References Cited

OTHER PUBLICATIONS tional Conference on Advanced Information Networking and Applications, 2010, pp. 1085-1092 (Secure). (Year: 2010).*
Dialog Search Report, dated May 3, 2022. (Year: 2022), 8 pgs.
Google Scholar Search, dated May 3, 2022. (Year: 2022), 3 pgs.
Google Patent, dated May 3, 2022 (Year: 2022), 2 pgs.
Google Patent1, dated May 3, 2022 (Year: 2022), 2 pgs.
U.S. Appl. No. 16/668,687: Notice of Allowance dated May 9, 2022 issued in U.S. Appl. No. 16/668,687. U.S. Appl. No. 16/668,687 has common subject matter as the instant application, the same inventors and the same Applicant, Mastercard International Incorporated.

* cited by examiner

SYSTEM, METHODS AND COMPUTER PROGRAM PRODUCTS FOR IDENTITY AUTHENTICATION FOR ELECTRONIC PAYMENT TRANSACTIONS

CROSS-REFERENCE TO RELATED APPLICATION

This application claims the benefit of, and priority to, Indian Patent Application No. 201911001234 filed on Jan. 10, 2019. The entire disclosure of the above application is incorporated herein by reference.

FIELD

The present disclosure generally relates to the field of electronic payment transactions, and more specifically to systems, methods and computer program products for preventing unauthorized use of a payment account for electronic payment transactions.

BACKGROUND

This section provides background information related to the present disclosure which is not necessarily prior art.

Electronic transactions and payments using electronic payment accounts are increasingly common, with the number of electronic payment transactions and ubiquity of electronic transaction mechanisms and services growing steadily.

The use of electronic payment transactions for effecting payment for goods or services through websites or network communication based payment software applications is particularly widespread, but has been found to present certain security challenges.

FIG. 1 illustrates a prior art system environment 100 that is configurable to implement prior art methods of identity authentication for electronic payment account based transactions. Client terminal 102 may comprise any network communication enabled data processing terminal from which a user accesses an online website, a banking software application or payment gateway through which payment is intended to be made to a merchant for products or services. Said client terminal 102 may be communicably coupled with merchant server 106 through communication network 104, and merchant server 106 may be configured to receive a payor's payment account information for the purposes of initiating a payment from the payor's payment account to a merchant payment account.

The initiation of payment from the payor's payment account to a merchant payment account is routinely made subject to at least one prior step of authenticating identity of the individual requesting initiation of the payment, to ensure that such individual is in fact the authorized holder or user of the payment account. Typically, however, existing systems for identity authentication are limited to requiring input of a static passcode or a password or a personal identification number. In some embodiments, prior art authentication systems also require a second type of authentication, which authentication may involve the merchant server 106 communicating with an issuer network 108 (i.e. a network corresponding to a financial institution that has issued the payor's payment account), intimating issuer network 108 that a payment transaction connected with a presented payment account has been initiated, and requesting issuer network 108 to commence an authentication process flow.

Issuer network 108 responds to a request for commencing an authentication process flow, from merchant server 106, by generating a dynamic password or a one-time-password (OTP) associated with the payment account and forwarding the dynamic password or OTP to a registered device 110 (for example, a registered mobile device) that is linked, in the records of the issuer network 108, with the authorized holder of the payment account. Assuming the payment card or payment account has been legitimately presented by the authorized holder thereof, said authorized holder may look up the received OTP on her/his registered device 110 and input the received OTP at client terminal 102 for onward communication through network 104 and/or merchant server 106 to issuer network 108.

Issuer network 108 compares the OTP received from client terminal 102 with the OTP forwarded to registered device 110 and in case of a match authenticates the identity of the individual/entity who has requested initiation of the payment transaction. Responsive to successful identity authentication, issuer network 108 completes the requested electronic transfer of funds from the payor's payment account to the merchant account.

Despite implementation of identity authentication based on either or both of static and dynamic passwords/passcodes, prior art systems have been found to be susceptible to misuse by malicious third parties, both in terms of misappropriation of payment account numbers and associated static passwords or static personal identification numbers (for example, through shoulder surfing or social engineering techniques) as well as in terms of misappropriation of OTPs sent to a registered mobile device (for example, by obtaining unauthorized access to data within an authorized holder's registered mobile device). The entire premise behind a dynamic password or OTP based authentication mechanism is that only an authorized holder/user of a payment account would have access to the registered client terminal linked with a specific payment account, and that access to an OTP sent to the registered client terminal establishes that the person who has such access is in fact the authorized holder/user of the payment account. It has however been found that OTPs can be intercepted en route to, or unauthorizedly retrieved from, a registered terminal device to which it is forwarded, and can thereafter be used to conclude a payment transaction from any other terminal device by any person who is not the authorized holder/user of the payment account.

There is accordingly a requirement for a solution that enables convenient and secure multi-factor authentication of an identity of an individual or entity seeking to use a payment account to effect an electronic payment transaction, wherein attempts to use terminal devices other than a registered client terminal associated with a payment account can be detected and refused.

SUMMARY

This section provides a general summary of the disclosure, and is not a comprehensive disclosure of its full scope or all of its features. Aspects and embodiments of the disclosure are set out in the accompanying claims.

The disclosure provides systems, methods and computer program products for preventing unauthorized use of a payment account for electronic payment transactions.

In an embodiment, the disclosure provides a method for identity authentication in connection with payment account information submitted for the purpose of network based electronic payment transaction(s). The method comprises, at an authentication server: (i) receiving an identity authentication request responsive to an initiated request for electronic payment from a payor account to a payee account, wherein said request for electronic payment is initiated within a network communication session between a client terminal and a merchant server, (ii) receiving information identifying the payor account, the payee account and a payment amount corresponding to the request for initiation of an electronic payment, (iii) receiving one or more network session data parameters corresponding to the network communication session, (iv) generating an authentication data record based on the received one or more network session data parameters, (v) transmitting the generated authentication data record for storage on a remote terminal device, wherein said remote terminal device is identified based on information identifying a registered terminal device or a registered instance of a payment software application associated with the identified payor account, (vi) retrieving from the client terminal, one or more data records associated with electronic payment transactions involving the client terminal, (vii) comparing the one or more data records retrieved from the client terminal against the generated authentication data record, and (viii) responsive to a match between the one or more data records retrieved from the client terminal against the generated authentication data record, generating an identity confirmation decision for transmission to a server from which the identity authentication request is received.

In a particular embodiment of the method, the server from which the identity authentication request is received is configured to respond to receiving the identity confirmation decision by authorizing an electronic payment of the payment amount from the payor account.

The one or more network session data parameters in the method may comprise one or more of, a unique ID associated with the client terminal, a unique ID associated with an instance of a payment software application implemented in the client terminal, a unique merchant ID associated with a merchant to whom the payment is intended to be made, a payee payment account number, a date stamp or time stamp associated with receipt of the request for initiation of electronic payment at the merchant server, and a session ID uniquely associated with the network communication session between the client terminal and the merchant server.

In a specific method embodiment, generating the authentication data record includes applying a hashing function, an encryption function or a transformative function to the received one or more network session data parameters.

The authentication data record may be transmitted for storage within a secure memory location associated with, controlled by or accessible by an instance of a payment application software that is implemented within the remote terminal device. The one or more data records associated with electronic payment transactions involving the client terminal may be retrieved from a secure memory location associated with, controlled by or accessible by an instance of a payment application software that is implemented within the client terminal.

In an embodiment of the method, wherein responsive to a determination that the one or more data records retrieved from the client terminal do not match the generated authentication data record, an identity denial decision is generated for transmission to a server from which the identity authentication request is received.

The server from which the identity authentication request is received may be configured to respond to receiving the identity denial decision by refusing to authorize an electronic payment of the payment amount from the payor account.

The disclosure additionally provides a system for identity authentication in connection with payment account information submitted for the purpose of network based electronic payment transaction(s). In an embodiment, the system comprises an authentication server comprising at least one processor and memory, and configured to (i) receive an identity authentication request responsive to an initiated request for electronic payment from a payor account to a payee account, wherein said request for electronic payment is initiated within a network communication session between a client terminal and a merchant server, (ii) receive information identifying the payor account, the payee account and a payment amount corresponding to the request for initiation of an electronic payment, (iii) receive one or more network session data parameters corresponding to the network communication session, (iv) generate an authentication data record based on the received one or more network session data parameters, (v) transmit the generated authentication data record for storage on a remote terminal device, wherein said remote terminal device is identified based on information identifying a registered terminal device or a registered instance of a payment software application associated with the identified payor account, (vi) retrieve from the client terminal, one or more data records associated with electronic payment transactions involving the client terminal, (vii) compare the one or more data records retrieved from the client terminal against the generated authentication data record, and (viii) responsive to a match between the one or more data records retrieved from the client terminal against the generated authentication data record, generate an identity confirmation decision for transmission to a server from which the identity authentication request is received.

In a particular embodiment of the system the server from which the identity authentication request is received is configured to respond to receiving the identity confirmation decision by authorizing an electronic payment of the payment amount from the payor account.

The system may be configured so that the one or more network session data parameters comprise one or more of, a unique ID associated with the client terminal, a unique ID associated with an instance of a payment software application implemented in the client terminal, a unique merchant ID associated with a merchant to whom the payment is intended to be made, a payee payment account number, a date stamp or time stamp associated with receipt of the request for initiation of electronic payment at the merchant server, and a session ID uniquely associated with the network communication session between the client terminal and the merchant server.

In a system embodiment generating the authentication data record includes applying a hashing function, an encryption function or a transformative function to the received one or more network session data parameters.

The authentication server may be configured to transmit the authentication data record for storage within a secure memory location associated with, controlled by or accessible by an instance of a payment application software that is implemented within the remote terminal device.

In an embodiment, the authentication server may be configured such that one or more data records associated with electronic payment transactions involving the client terminal are retrieved from a secure memory location associated with, controlled by or accessible by an instance of a payment application software that is implemented within the client terminal.

The authentication server may be configured such that responsive to a determination that the one or more data records retrieved from the client terminal do not match the generated authentication data record, an identity denial decision is generated for transmission to a server from which the identity authentication request is received.

The server from which the identity authentication request is received is in an embodiment, configured to respond to receiving the identity denial decision by refusing to authorize an electronic payment of the payment amount from the payor account.

The disclosure additionally provides computer program products for identity authentication in connection with payment account information submitted for the purpose of network based electronic payment transaction(s), comprising a non-transitory computer usable medium having computer readable program code embodied therein, the computer readable program code comprising instructions for implementing any of the method embodiments described in the disclosure herein.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
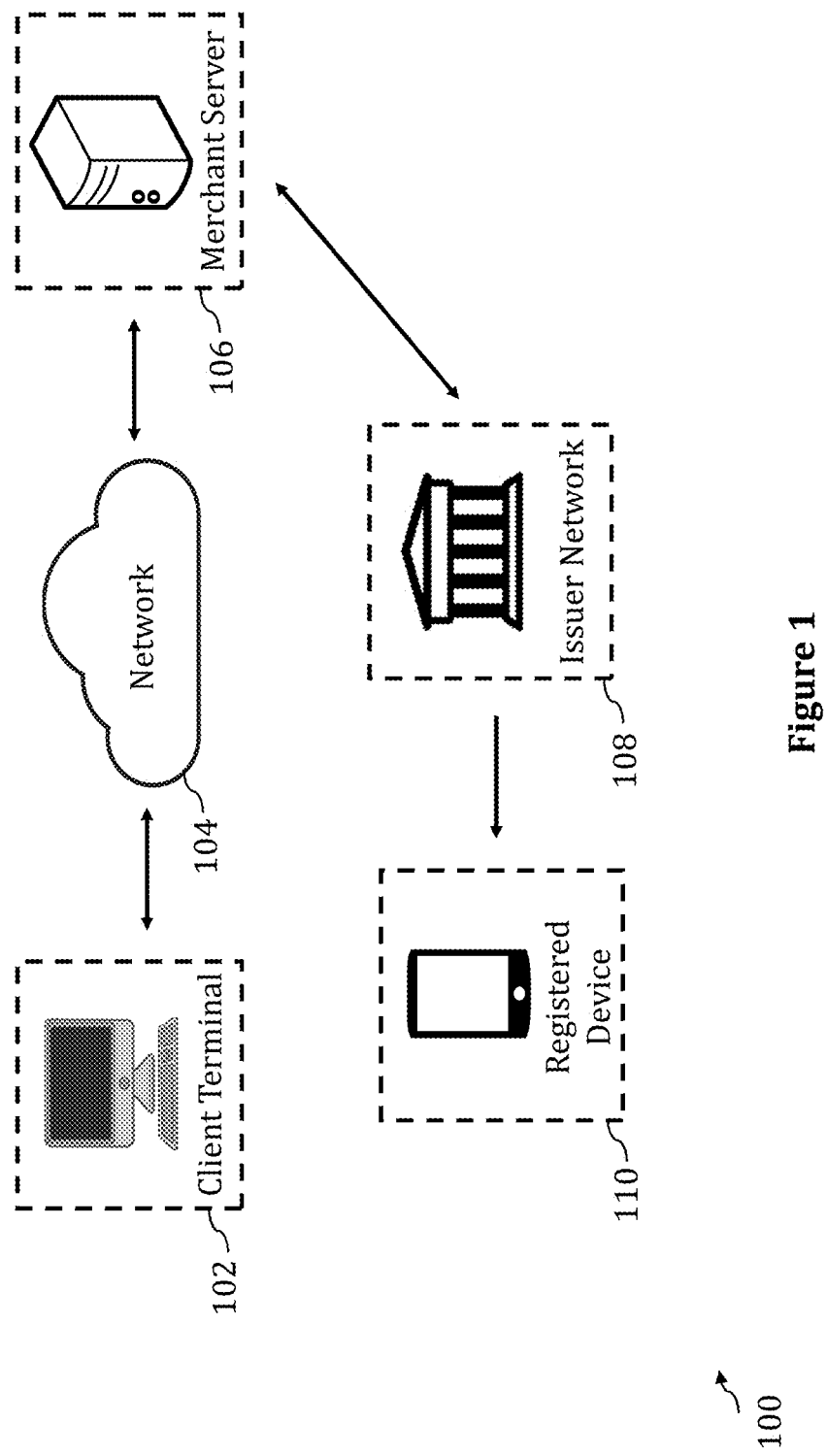
FIG. 1 illustrates a prior art system environment for authenticating and implementing electronic transactions through a payment account based transaction system.

Embodiments will be described, by way of example only, with reference to the drawings. The description and specific examples included herein are intended for purposes of illustration only and are not intended to limit the scope of the present disclosure. The present disclosure provides systems, methods and computer program products that enable convenient and secure authentication of an identity of an individual or entity that is seeking to use a payment account to effect an electronic payment transaction.

For the purposes of the present disclosure, the following terms shall be understood to have the corresponding meanings provided below:

"Acquirer" shall mean a business (e.g., a financial institution or a merchant bank) that contracts with a merchant to coordinate with the issuer network of a customers' payment card or payment account.

"Account Holder" shall mean an authorized user of a payment account who is making a purchase or effecting an electronic transaction with a payment card or payment account.

"Payment network" shall refer to the intermediary between the merchant's acquirer and the customer's issuer (for example, Mastercard® or Visa®). The payment network primarily coordinates payment card or payment account transactions between acquirers and issuers, and additionally coordinates clearing and settlement services to transfer payments from issuers to merchants.

"Issuer" shall mean a financial institution that issues payment accounts and maintains a contract with a customer or account holder for repayment or settlement of purchases made on the payment card.

"Issuer network" shall refer to a communication network, including hardware, software and other equipment used by an issuer to transmit and process payment account transactions and information related to customers, payment accounts and transactions.

"Merchant" shall mean an authorized acceptor of payment account information for the payment of goods or services sold by the merchant.

"Payment card" shall mean a card or data associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable.

"Payment account" shall mean any account that may be used for the purposes of effecting an electronic payment or electronic transaction, and shall include any electronic transaction account, payment card account, bank account or electronic wallet account.

Figure 2:
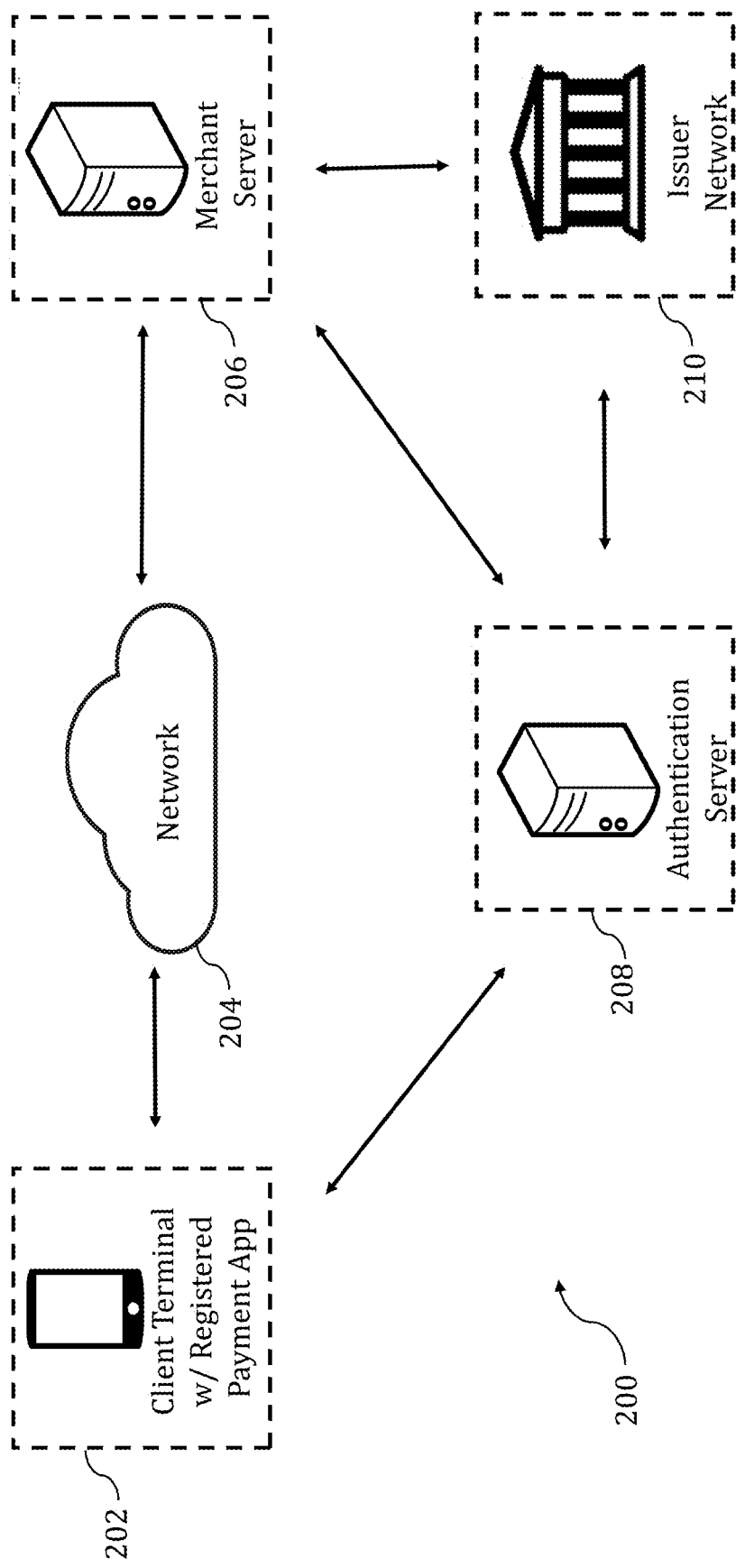
FIG. 2 illustrates a system environment that has been configured for authenticating and implementing electronic transactions through a payment account based transaction system in accordance with the present disclosure.

FIG. 2 illustrates a system environment 200 in accordance with the present disclosure that is configurable to implement methods of identity authentication in accordance with the present disclosure.

Client terminal 202 may comprise any network communication enabled data processing terminal having an installed instance of a payment software application implemented thereon, wherein at least one of the client terminal 202 and the installed instance of the payment software application are registered or associated with a payment account maintained by an issuer, and wherein said registration or association between the client terminal 202 and/or the installed instance of the payment software application on the one hand and the payment account maintained by the issuer on the other hand, is recorded in the data records of the issuer. As a result of said registration or association, the issuer can electronically communicate with client terminal 202 or with the installed instance of the registered payment software application implemented on the client terminal 202.

Client terminal 202 may be communicably coupled with merchant server 206 through network 204. Merchant server 206 may be configured to receive a payor's payment account information (from client terminal 202) for the purposes of effecting or initiating a payment from a payor payment account to a merchant payment account. In an embodiment, network 204 may comprise a payment network configured to enable payments between accounts maintained by an issuer institution and an acquirer institution respectively, or alternatively may comprise a data communication network.

As illustrated in FIG. 2, merchant server 206 may be communicably coupled with authentication server 208 and with issuer network 210. Authentication server 208 may be configured for network based data communication with client terminal 202 or with a registered instance of a payment software application installed thereon. Authentication server 208 may also be communicably coupled with issuer network 210, in a manner that enables electronic data interchange therebetween. In various embodiments of the disclosure, authentication server 208 may be located within a payment network or within an issuer network 210, or may comprise a standalone server or server cluster. In one embodiment, authentication server 208 may even comprise a processor implemented server or server process thread or virtual server implemented within client terminal 202. Authentication server 208 (as discussed in more detail below) may be configured to implement authentication process flows in accordance with the present disclosure. The operation of individual components within system environment 200 will be discussed in more detail in connection with method embodiments of the present disclosure.

Figure 3:
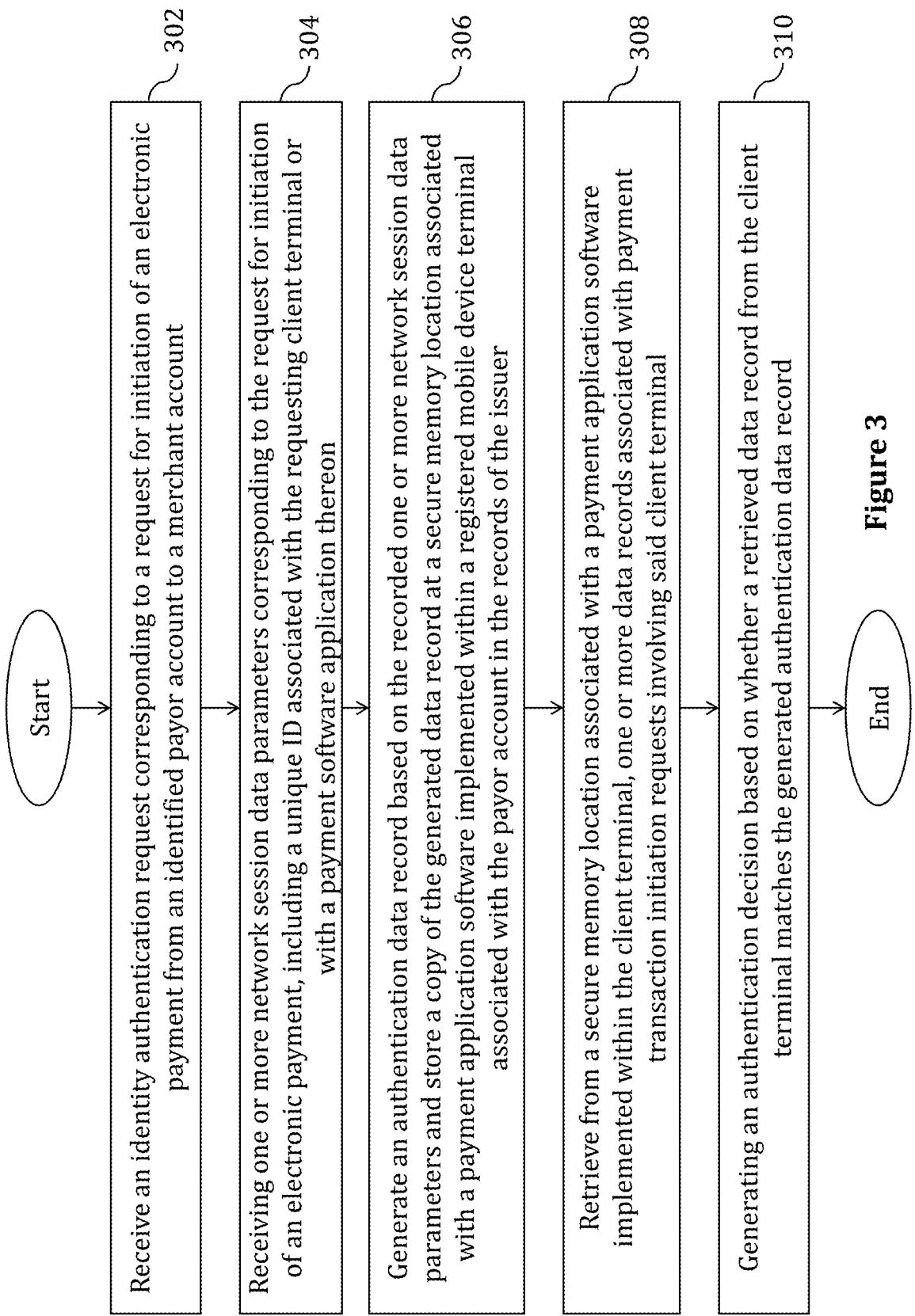
FIG. 3 illustrates a method of authenticating a payor identity in accordance with the present disclosure.

FIG. 3 illustrates a method of authentication of a payor's identity in accordance with the present disclosure. In particular embodiments of the disclosure, the steps of FIG. 3 may be implemented within the system environment 200 of FIG. 2, and in a more particular embodiment within authentication server 208.

Step 302 comprises receiving an identity authentication request corresponding to a received request for initiation of an electronic payment from an identified payor account to a merchant account. The request for initiation of an electronic payment may be generated at client terminal 202 or at merchant server 206, and may include information identifying the payor account, information identifying the merchant account, and a payment amount. The identity authentication request may be generated based on the information extracted from the request for initiation of an electronic payment, and may include (or may be followed by transmission to authentication server 208) the information identifying the payor account, information identifying the merchant account, and the payment amount. In an embodiment, the information identifying the payor account may include one or more of a payment card number or payment account number identified or presented by the payor, a payor name or payor payment account holder name, and an identifier uniquely corresponding to an issuer institution associated with the payor's payment card number or payment account number. The identity authentication request may in various embodiments be generated at any of client terminal 202, merchant server 206 or issuer network 210, and may be transmitted to authentication server 208 for the purpose of authenticating an identity of a person or entity that has initiated the request for electronic payment at client terminal 202.

In an embodiment of the disclosure, the information extracted from the request for initiation of the payment transaction for generating the identity authentication request may be input at client terminal 202 for onward transmission to merchant server 206, or may be pre-stored within the payment software application within client terminal 202, and may be transmitted by the payment software application to the merchant server 206 in response to a payment initiation request made by a payor through said payment software application (for example, when the payor initiates a payment request or a payment instruction through the payment software application for an online purchase or an online payment to be made at merchant server 206).

The information identifying the merchant account may include one or more of a payment account number associated with the merchant, a merchant name or an account holder name associated with the merchant's payment account, and an identifier uniquely corresponding to an acquirer institution associated with the merchant's payment account number. This information may be retrieved or obtained from the merchant server 206 for the purposes of generating the payment request. In an embodiment, this information may first be transmitted by merchant server 206 to client terminal 202 for inclusion (by the payment software application implemented within client terminal 202) within the request for initiation of an electronic payment. In another embodiment, this information may be appended to information extracted from a request for initiation of an electronic payment that has been generated by the payment software application implemented within client terminal 202, when such request is forwarded by client terminal 202 to merchant server 206.

In an embodiment of the disclosure, in step 302 the identity authentication request may be received at authentication server 208 either directly from client terminal 202 or through merchant server 206 or through issuer network 210.

Step 304 comprises receiving at authentication server 208, one or more network session data parameters corresponding to a network communication session between client terminal 202 and merchant server 206, within which network communication session, the request for initiation of the electronic payment has been generated. The one or more network session data parameters may be recorded by authentication server 208 in a database configured for this purpose. In an embodiment of the disclosure, the one or more network session data parameters may be extracted or identified at merchant server 206 and may thereafter be transmitted directly, or through one or more communication intermediaries, to authentication server 208. The one or more network session data parameters corresponding to the received request for initiation of the electronic payment includes at least a unique ID associated with the requesting client terminal 202 (for example, a unique device ID or MAC ID) or with an instance of the payment software application implemented thereon (for example, a unique software application ID). Other network session data parameters corresponding to the request for initiation of the electronic payment may include one or more of (i) a unique merchant ID associated with a merchant to whom the payment is intended to be made (ii) a merchant payment account number, (iii) a date stamp and/or time stamp associated with receipt of the request for initiation of electronic payment from client terminal 202 at merchant server 206, (iv) a payment amount identified within the request for initiation of electronic payment, and (v) a session ID uniquely associated with the network communication session between the client terminal 202 and merchant server 206 during which the request for initiation of electronic payment is initiated.

At step 306, authentication server 208 generates an authentication data record that uniquely corresponds to the received identity authentication request, and stores a copy of the generated authentication data record at a memory location (preferably a secure memory location) associated with, controlled by or accessible by an instance of a payment application software that is implemented within a registered mobile device terminal that is (according to the records of the issuer or issuer network 210) associated with the payor's payment account. The generated authentication data record is generated based on the network session data parameters received at step 304 that correspond to the request for initiation of the electronic payment. In an embodiment of the disclosure, the generated authentication data record is an authentication cookie, authentication key or authentication string comprising a hashed and/or encrypted value that is generated based on hashing and/or encryption of one or more of the network session data parameters received at step 304. The hashing and/or encryption may be achieved through any number of hashing, encryption or transformative functions that would be apparent to the skilled person.

The authentication data record may be generated at authentication server 208. Additionally, authentication sever 208 may query, and receive from issuer network 210, information identifying a registered mobile device terminal associated (in the records of the issuer network 210) with the payor's payment account (for example, by way of a MAC ID, device ID, network ID, specific network address or mobile device number) and/or identifying an installed instance of a payment application software that is implemented within a registered mobile device terminal associated with the payor's payment account (for example, by way of a software application ID, payment account ID, network path or specific network address). Responsive to receiving the requested information from issuer network 210, authentication server 208 transmits to and implements storage of the generated authentication record within a memory location associated with, controlled by or accessible by a payment application software that is implemented within the registered mobile device terminal that has been identified based on the records of the issuer or issuer network 210.

At step 308, the authentication server 208 requests and/or retrieves from a memory location (preferably a secure memory location) associated with, controlled by or accessible by the instance of the payment application software that is implemented within client terminal 202, one or more data records associated with payment transaction initiation requests involving client terminal 202 and/or said instance of the payment application software that is implemented within client terminal 202. In a specific embodiment, said one or more data records may be retrieved from memory associated with, controlled by or accessible by the instance of the payment application software that is implemented within client terminal 202. In a particular embodiment, the one or more data records retrieved from client terminal 202 at step 308 comprise one or more authentication data records stored by the authentication server 208 in connection with requests for initiation of electronic payment transactions that have been generated by the instance of the payment application software that is implemented within client terminal 202.

Authentication server 208 thereafter checks for a match between the data record(s) retrieved at step 308 and the authentication data record that has been generated at step 306. Step 310 thereafter comprises generating an authentication decision based on whether a match is found between the data record(s) retrieved at step 308 and the authentication data record that has been generated at step 306.

In an embodiment, responsive to a data record that is retrieved from client terminal 202 (at step 308) being found to match the generated authentication data record (generated at step 306), the authentication server 208 generates an authentication confirmation decision. This authentication confirmation decision may be forwarded to issuer network 210. Issuer network 210 may respond to receipt of the authentication confirmation decision by transferring the payment amount specified in the request of initiation of an electronic payment (from step 302) from the payor's payment account to the merchant's payment account. In certain embodiments, the authentication confirmation decision may also be communicated to merchant server 206 and/or directly or indirectly to client terminal 202.

Alternatively, in the event no data record(s) that is retrieved from client terminal 202 at step 308 is found to match the generated authentication data record (generated at step 306), the authentication server generates an authentication denial decision, which authentication denial decision may be communicated to one or more of issuer network 210, merchant server 206 and client terminal 202. Issuer network 210 may respond to receipt of the authentication denial decision by rejecting or denying the request for initiation of an electronic payment that has been received from client terminal 202 (at step 302). Merchant server 206 may respond to receipt of the authentication denial decision by terminating or treating as incomplete, the transaction corresponding to the received request for initiation of electronic payment.

It would be understood that a data record retrieved from client terminal 202 for the purpose of the matching at step 310 would only match an authentication data record generated at step 306 if the client terminal 202 (from which a request for initiation of an electronic payment is received at step 302) is in fact the registered mobile device terminal associated with the payor account in the records of the issuer (or is a client terminal on which a registered instance of the payment software application that is associated with the payor account in the records of the issuer, is installed), since at step 306, the generated authentication data record has been transmitted and stored on such registered mobile device terminal, or such client terminal.

On the other hand, in the event the request for initiation of an electronic payment at step 302 is received from a client terminal 202 that is not the registered mobile device terminal associated with the payor account in the records of the issuer (or is not a client terminal on which a registered instance of a payment software application that is associated with the payor account in the records of the issuer has been implemented), the authentication data record generated at step 306 would not be stored on such client terminal 202, and the step of retrieving data records from such client terminal 202 for comparison against the authentication data record generated at step 306 would not result in a match.

Additionally, since the authentication data record is generated based on real time or dynamic information corresponding to or extracted from the request for initiation of electronic payment that is received at step 302 (see for example, the various network session data parameters discussed in connection with step 304), the likelihood of an unauthorized client terminal generating and successfully storing a fake authentication data record or coincidentally having a matching data record among its data records are mathematically infinitesimal. Yet further, in embodiments where the authentication data record is generated based on an encryption or hashing function, the likelihood of successfully spoofing a fake authentication data record (even if the spoofing entity has access to all the relevant dynamic network session data parameters involved in generation of said authentication data record) is extremely low, since the spoofing entity would also require prior knowledge of the encryption or hashing function used by authentication server 208. The fact that authentication server 208 hashes or encrypts the authentication data record and stores it in a secure memory location within the registered mobile device terminal associated with the payor account in the records of the issuer (or a terminal on which a registered instance of a payment software application that is associated with the payor account in the records of the issuer has been implemented) also makes it difficult for an unauthorized entity to locate the authentication data record and transmit it to another client terminal for the purposes of carrying out an unauthorized payment transaction from such other client terminal.

Figure 4:
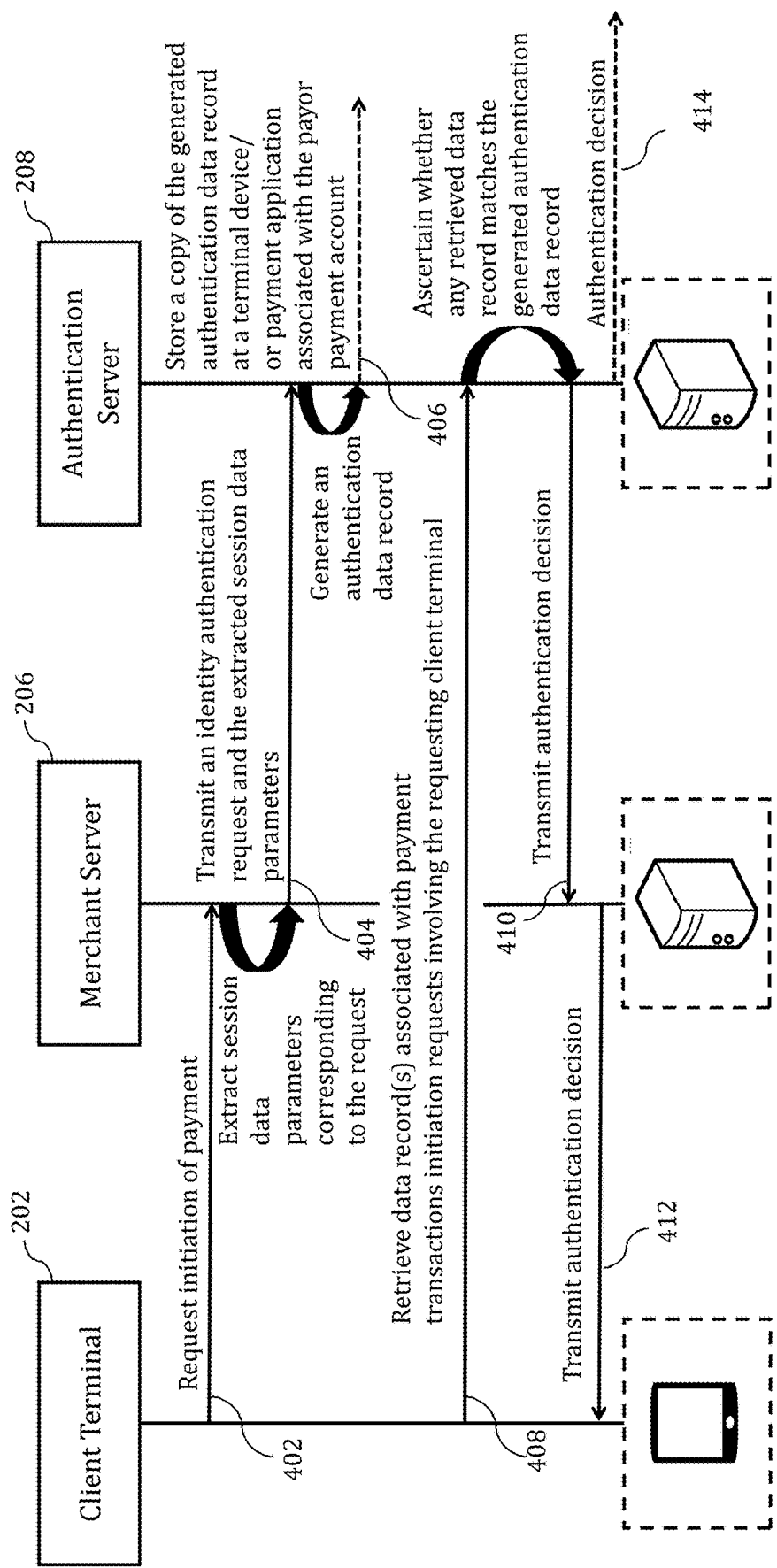
FIG. 4 is a communication flow diagram illustrating communication flow between system entities involved in the method of FIG. 3.

FIG. 4 is a communication flow diagram illustrating communication flow between system entities involved in an embodiment of the method of FIG. 3.

Step 402 comprises transmission of a request for initiation of payment from client terminal 202 to merchant server 206. Merchant server 206 extracts and/or collates network session data parameters corresponding to the received payment request, and at step 404 transmits an identity authentication request and the extracted network session data parameters to authentication server 208. In an embodiment, the extracted and transmitted network session data parameters may include any one or more of the network session data parameters discussed in connection with step 304 of FIG. 3.

Authentication server 208 generates an authentication data record based on the recorded network session data parameters received from merchant server 206. Step 406 thereafter comprises storing a copy of the generated authentication data record within a memory location associated with, controlled by or accessible by an instance of a payment application software that is installed within a mobile device terminal (that has been identified based on the records of the issuer or issuer network 210) associated with a payor payment account that is specified within the request for initiation of payment received from client terminal 202 (at step 402).

Step 408 comprises receiving or retrieving from client terminal 202 (at authentication server 208) one or more data records associated with payment transaction initiation requests involving (or generated at) client terminal 202 or involving (or generated by) an instance of a payment application software installed on requesting client terminal 202. Authentication server 208 thereafter ascertains whether any data record received/retrieved from client terminal 202 matches the generated authentication record that was previously generated and stored (at step 406) at a mobile device terminal associated with a payor payment account.

Based on the results of the comparison step (determining whether a data record retrieved or received from client terminal 202 matches the generated authentication data record stored at step 406), an authentication decision is transmitted to merchant server 206 (step 410), to client terminal 202 (at step 412) and to the issuer network associated with the payor's payment account (step 414).

Figure 5:
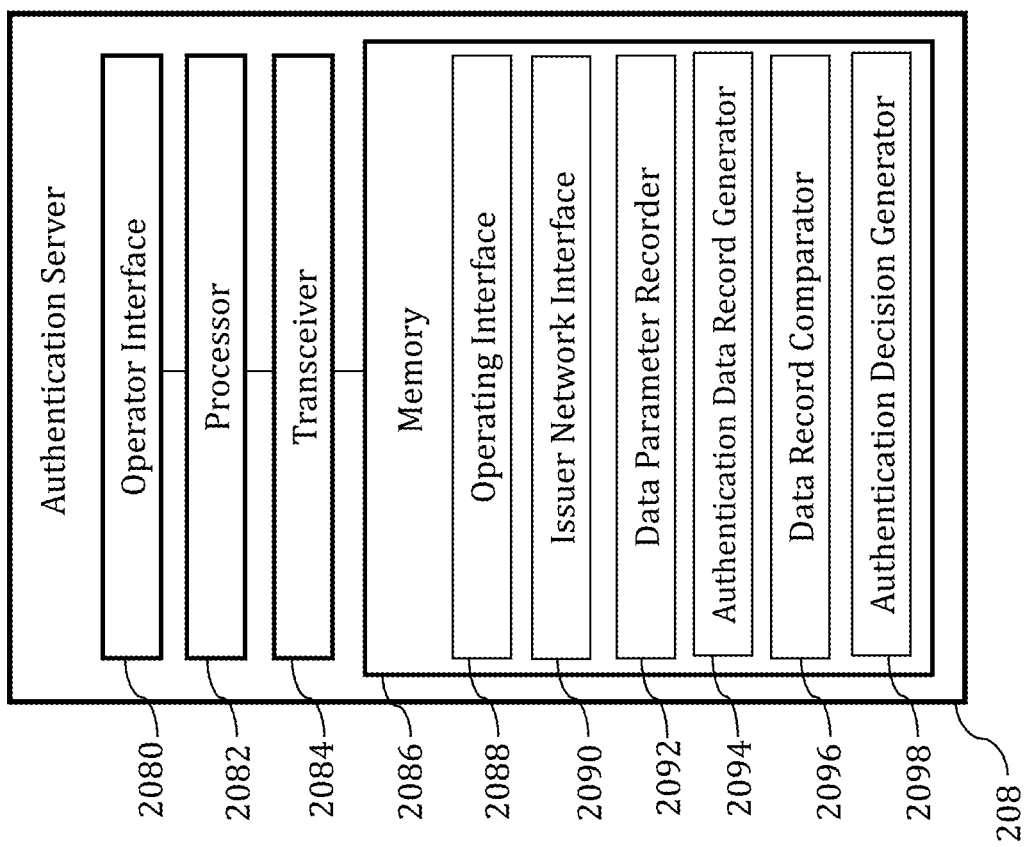
FIG. 5 illustrates an exemplary authentication server configured in accordance with the teachings of the present disclosure.

FIG. 5 illustrates a specific embodiment of authentication server 208. Authentication server 208 may comprise any processor implemented server device or data processing device configured for network based communication. In specific embodiments, authentication server 208 may include operator interface 2080, processor 2082, communication transceiver 2084 and memory 2086, which memory 2086 may include transitory memory and/or non-transitory memory. In an exemplary embodiment, memory 2086 may have stored therewithin, (i) an operating system 2088 configured for managing device hardware and software resources and that provides common services for software programs implemented within authentications server 208, (ii) an issuer network interface 2090 configured to enable authentication server 208 to communicate and exchange data with an issuer network 210, (iii) a data parameter recorder 2092 configured to or record network session data parameters corresponding to the received payment request (i.e., configured to record the network session data parameters received of step 304 of FIG. 3), (iv) an authentication data record generator 2094 configured to generate an authentication data record that uniquely defines the requested electronic payment transaction (i.e., configured to generate an authentication data record in accordance with step 306 of FIG. 3), (v) a data record comparator 2096 configured to check for a match between data record(s) retrieved from client terminal 202 (i.e., at step 308 of FIG. 3) and an authentication data record generated by authentication data record generator 2094, and (vi) an authentication decision generator configured to generate an authentication confirmation decision or an authentication denial decision based on the results of the comparisons implemented by data record comparator 2096 (i.e., for generating an authentication confirmation decision if a match is found by data record comparator 2096 and for generating an authentication denial decision if a match is not found by data record comparator 2096).

Figure 6:
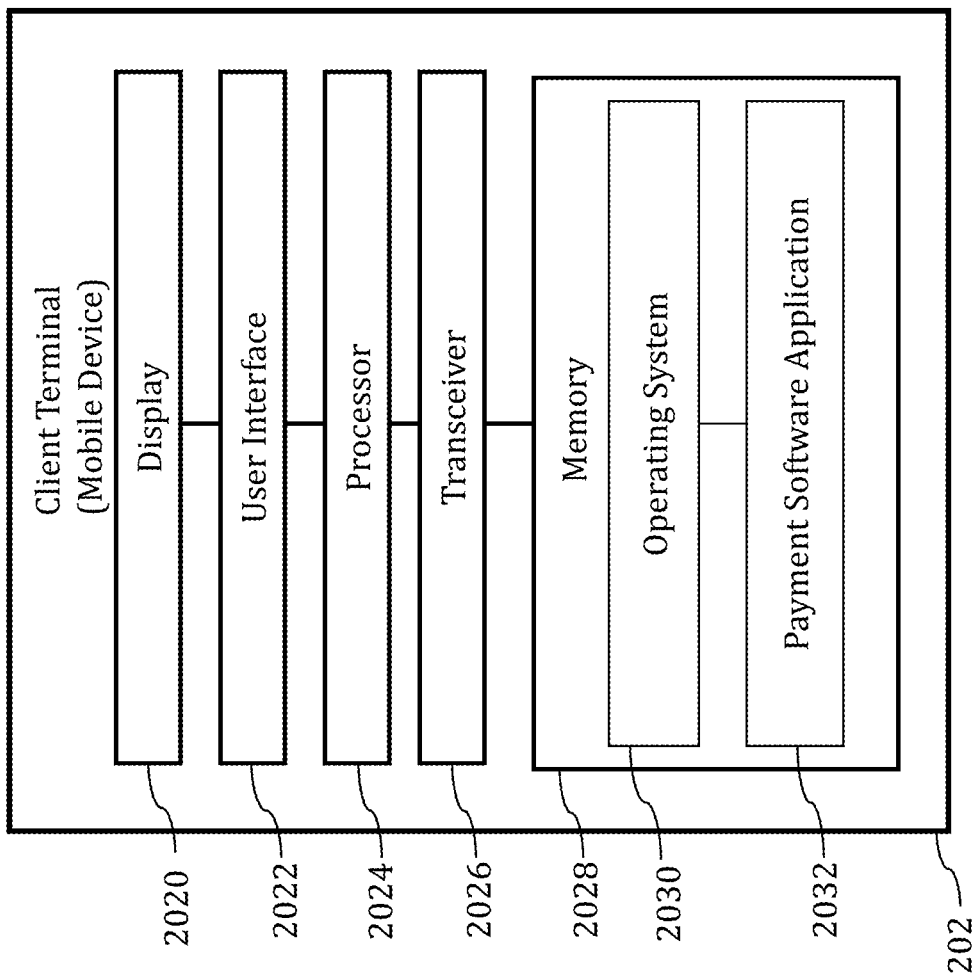
FIG. 6 illustrates an exemplary client terminal configured in accordance with the teachings of the present disclosure.

FIG. 6 illustrates a specific embodiment of client terminal 202. Client terminal 202 may comprise a display 2020, a user interface 2022, a processor 2024, a communication transceiver 2026 and memory 2028, which memory 2028 may include transitory memory and/or non-transitory memory. In an exemplary embodiment, memory 2028 may have stored therewithin, (i) an operating system 2030 configured for managing device hardware and software resources and that provides common services for software programs implemented within client terminal 202, and (ii) an installed instance of a payment software application 2032 that is configured to operate generally in accordance with the methods described hereinabove, including to generate a request for initiation of an electronic payment in accordance with step 302 of FIG. 3.

Figure 7:
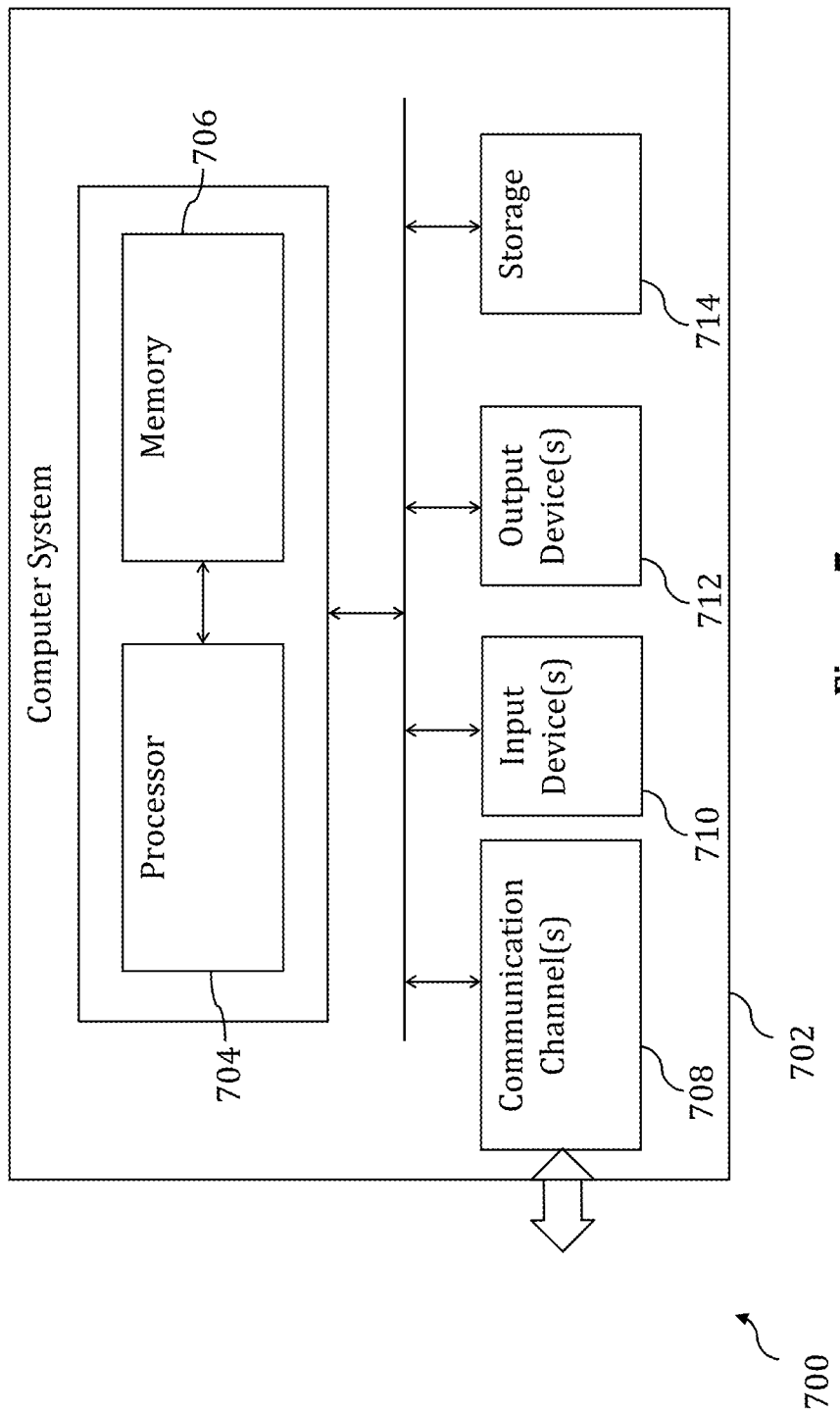
FIG. 7 illustrates an exemplary computer system according to which various embodiments of the present disclosure may be implemented.

FIG. 7 illustrates an exemplary computer system according to which various embodiments of the present disclosure may be implemented.

System 700 includes computer system 702 which in turn comprises one or more processors 704 and at least one memory 706. Processor 704 is configured to execute program instructions, and may be a real processor or a virtual processor. It will be understood that computer system 702 does not suggest any limitation as to scope of use or functionality of described embodiments. The computer system 702 may include, but is not limited to, one or more of a general-purpose computer, a programmed microprocessor, a micro-controller, an integrated circuit, and other devices or arrangements of devices that are capable of implementing the steps that constitute the method of the present disclosure. Exemplary embodiments of a computer system 702 in accordance with the present disclosure may include one or more servers, desktops, laptops, tablets, smart phones, mobile phones, mobile communication devices, tablets, phablets and personal digital assistants. In an embodiment of the present disclosure, the memory 706 may store software for implementing various embodiments of the present disclosure. The computer system 702 may have additional components. For example, the computer system 702 may include one or more communication channels 708, one or more input devices 710, one or more output devices 712, and storage 714. An interconnection mechanism (not shown), such as a bus, controller, or network, interconnects the components of the computer system 702. In various embodiments of the present disclosure, operating system software (not shown) provides an operating environment for various softwares executing in the computer system 702 using a processor 704, and manages different functionalities of the components of the computer system 702.

The communication channel(s) 708 allow communication over a communication medium to various other computing entities. The communication medium provides information, such as program instructions, or other data in a communication media. The communication media includes, but is not limited to, wired or wireless methodologies implemented with an electrical, optical, RF, infrared, acoustic, microwave, Bluetooth or other transmission media.

The input device(s) 710 may include, but is not limited to, a touch screen, a keyboard, mouse, pen, joystick, trackball, a voice device, a scanning device, or any another device that is capable of providing input to the computer system 702. In an embodiment of the present disclosure, the input device(s) 710 may be a sound card, or similar device, that accepts audio input in analog or digital form. The output device(s) 712 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 702.

The storage 714 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 702. In various embodiments of the present disclosure, the storage 714 may contain program instructions for implementing any of the described embodiments.

In an embodiment of the present disclosure, the computer system 702 is part of a distributed network or a part of a set of available cloud resources.

The present disclosure may be implemented in numerous ways, including as a system, a method, or a computer program product, such as a computer readable storage medium or a computer network wherein programming instructions are communicated from a remote location.

The present disclosure may suitably be embodied as a computer program product for use with the computer system 702. The method described herein is typically implemented as a computer program product, comprising a set of program instructions that is executed by the computer system 702, or any other similar device. The set of program instructions may be a series of computer readable codes stored on a tangible medium, such as a computer readable storage medium (storage 714), for example, diskette, CD-ROM, ROM, flash drives or hard disk, or transmittable to the computer system 702, via a modem or other interface device, over either a tangible medium, including, but not limited to, optical or analogue communications channel(s) 708. The implementation of the disclosure as a computer program product may be in an intangible form using wireless techniques including, but not limited to, microwave, infrared, Bluetooth or other transmission techniques. These instructions can be preloaded into a system or recorded on a storage medium, such as a CD-ROM, or made available for downloading over a network, such as the Internet, or a mobile telephone network. The series of computer readable instructions may embody all or part of the functionality previously described herein.

Based on the above, it would be apparent that the present disclosure offers significant advantages. In particular, by offering convenient and secure ways for authentication of an identity of an individual/entity that initiates an electronic payment transaction through a payment software application installed on a client terminal, through a merchant server.

While the exemplary embodiments of the present disclosure are described and illustrated herein, it will be appreciated that they are merely illustrative. It will be understood by those skilled in the art that various modifications in form and detail may be made therein without departing from or offending the spirit and scope of the disclosure as defined by the appended claims. Additionally, the disclosure illustratively disclosed herein suitably may be practiced in the absence of any element which is not specifically disclosed herein,—and in a particular embodiment that is specifically contemplated, the disclosure is intended to be practiced in the absence of any one or more element which are not specifically disclosed herein.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, and as described, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for providing identity authentication in connection with submission of payment account information for network based electronic payment transaction(s), the method comprising:
   receiving, at an authentication server, an identity authentication request from a merchant server responsive to an initiated request for electronic payment from a payor account to a payee account, wherein said identity authentication request for electronic payment is initiated within a network communication session between a client terminal and the merchant server, the authentication server separate from the merchant server and the client terminal;
   receiving, at the authentication server, information identifying the payor account, the payee account and a payment amount corresponding to the initiated request for the electronic payment;
   receiving, at the authentication server, from the merchant server, one or more network session data parameters corresponding to the network communication session, wherein the one or more network session data parameters includes a session ID specific to the network communication session;
   generating, by the authentication server, an authentication data record, the authentication data record including the received one or more network session data parameters;
   transmitting, by the authentication server, the generated authentication data record for storage on a remote terminal device, wherein said remote terminal device is identified based on information identifying a registered terminal device or a registered instance of a payment software application associated with the identified payor account;
   retrieving, by the authentication server, from the client terminal, one or more data records associated with electronic payment transactions involving the client terminal, the one or more data records including the session ID specific to the network communication session;
   comparing, by the authentication server, at least the session ID from the one or more data records retrieved from the client terminal against the session ID from the generated authentication data record; and
   responsive to a match between the one or more data records retrieved from the client terminal against the generated authentication data record, generating, by the authentication server, an identity confirmation decision for transmission to the merchant server from which the identity authentication request is received.

2. The method of claim 1, wherein the merchant server from which the identity authentication request is received is configured to respond to receiving the identity confirmation decision by authorizing the electronic payment of the payment amount from the payor account.

3. The method of claim 1, wherein the one or more network session data parameters further comprise one or more of: a unique ID associated with the client terminal, a unique ID associated with an instance of the electronic payment software application implemented in the client terminal, a unique merchant ID associated with a merchant to whom the electronic payment is intended to be made, and/or a date stamp or time stamp associated with receipt of the request for initiation of the electronic payment at the merchant server; and
   wherein comparing at least the session ID from the one or more data records retrieved from the client terminal against the session ID from the generated authentication data record includes comparing the one or more data records retrieved from the client terminal against each of the one or more network session data parameters from the generated authentication data record.

4. The method of claim 1, wherein generating the authentication data record includes applying one or more of: a hashing function, an encryption function or a transformative function to the received one or more network session data parameters.

5. The method of claim 1, wherein the one or more data records associated with the electronic payment transactions involving the client terminal are retrieved from a secure memory location associated with, controlled by or accessible by an instance of the payment application software that is implemented within the client terminal.

6. A system for identity authentication in connection with submission of payment account information for network based electronic payment transaction(s), the system comprising:
   an authentication server comprising at least one processor and memory, and configured to:
      receive an identity authentication request from a merchant server responsive to an initiated request for electronic payment from a payor account to a payee account, wherein said request for electronic payment is initiated within a network communication session between a client terminal and the merchant server;

receive information identifying the payor account, the payee account and a payment amount corresponding to the request for initiation of the electronic payment;

receive, from the merchant server and separate from the identity authentication request, one or more network session data parameters corresponding to the network communication session, wherein the one or more network session parameters includes a session ID specific to the network communication session;

generate an authentication data record including the received one or more network session data parameters;

transmit the generated authentication data record for storage on a remote terminal device, wherein said remote terminal device is identified based on information identifying a registered terminal device or a registered instance of a payment software application associated with the identified payor account;

retrieve, from the client terminal, one or more data records associated with electronic payment transactions involving the client terminal, the one or more data records including the session ID specific to the network communication session;

compare at least the session ID from the one or more data records retrieved from the client terminal against the session ID from the generated authentication data record; and responsive to a match between the one or more data records retrieved from the client terminal against the generated authentication data record, generate an identity confirmation decision for transmission to the merchant server from which the identity authentication request is received.

7. The system of claim 6, wherein the merchant server from which the identity authentication request is received is configured to respond to receiving the identity confirmation decision by authorizing the electronic payment of the payment amount from the payor account.

8. The system of claim 6, wherein the one or more network session data parameters further comprise one or more of: a unique ID associated with the client terminal, a unique ID associated with an instance of the payment software application implemented in the client terminal, a unique merchant ID associated with a merchant to whom the electronic payment is intended to be made, and/or a date stamp or time stamp associated with receipt of the request for initiation of the electronic payment at the merchant server; and wherein the authentication server is configured to further compare one or more of: the unique ID associated with the client terminal, the unique ID associated with the instance of the payment software application implemented in the client terminal, the unique merchant ID associated with the merchant to whom the electronic payment is intended to be made, and/or the date stamp or time stamp from the one or more data records against the one or more of: the unique ID associated with the client terminal, the unique ID associated with the instance of the payment software application implemented in the client terminal, the unique merchant ID associated with the merchant to whom the electronic payment is intended to be made, and/or the date stamp or time stamp from the generated authentication data record.

9. The system of claim 6, wherein the authentication server is configured, in connection with generating the authentication data record, to apply one or more of: a hashing function, an encryption function or a transformative function to the received one or more network session data parameters.

10. The system of claim 6, wherein the authentication server is configured to transmit the authentication data record for storage within a secure memory location associated with, controlled by or accessible by an instance of the payment application software that is implemented within the remote terminal device.

11. The system of claim 6, wherein the authentication server is configured such that one or more data records associated with the electronic payment transactions involving the client terminal are retrieved from a secure memory location associated with, controlled by or accessible by an instance of the payment application software that is implemented within the client terminal.

12. The system of claim 6, wherein the authentication server is configured, responsive to a determination that the session ID from the one or more data records retrieved from the client terminal does not match the session ID from the generated authentication data record, to generate an identity denial decision for transmission to the merchant server from which the identity authentication request is received.

13. The system of claim 12, wherein the merchant server from which the identity authentication request is received is configured to respond to receiving the identity denial decision by refusing to authorize the electronic payment of the payment amount from the payor account.

* * * * *